(12) United States Patent
Watanabe

(10) Patent No.: US 9,303,767 B2
(45) Date of Patent: Apr. 5, 2016

(54) SEAL RING

(71) Applicant: NOK CORPORATION, Tokyo (JP)

(72) Inventor: Hideya Watanabe, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/620,708

(22) Filed: Feb. 12, 2015

(65) Prior Publication Data

US 2015/0240948 A1    Aug. 27, 2015

(30) Foreign Application Priority Data

Feb. 21, 2014  (JP) .................. 2014-032095

(51) Int. Cl.
| | | |
|---|---|---|
| *F16J 15/32* | (2006.01) | |
| *F16J 15/16* | (2006.01) | |
| *F01D 11/00* | (2006.01) | |
| *F16J 15/44* | (2006.01) | |
| *F16J 15/34* | (2006.01) | |

(52) U.S. Cl.
CPC ............... *F16J 15/164* (2013.01); *F01D 11/00* (2013.01); *F01D 11/003* (2013.01); *F01D 11/006* (2013.01); *F16J 15/34* (2013.01); *F16J 15/441* (2013.01); *F16J 15/442* (2013.01)

(58) Field of Classification Search
CPC ................... F16J 9/00; F16J 9/12; F16J 9/14; F16J 9/16; F16J 9/20; F16J 9/203
See application file for complete search history.

(56) References Cited

U.S. PATENT DOCUMENTS

| | | | | |
|---|---|---|---|---|
| 1,813,791 | A * | 7/1931 | Wuerfel ........................ | 277/457 |
| 1,881,849 | A * | 10/1932 | Morton ........................ | 277/446 |
| 2,124,094 | A * | 7/1938 | Wenzel ........................ | 277/464 |
| 2,169,613 | A * | 8/1939 | Niederlehner ................ | 277/464 |
| 2,565,306 | A * | 8/1951 | Gray ........................... | 277/464 |
| 5,934,680 | A * | 8/1999 | Kakehi et al. ................ | 277/499 |
| 6,193,236 | B1 * | 2/2001 | Helpap ........................ | 277/435 |

* cited by examiner

*Primary Examiner* — Gilbert Lee
(74) *Attorney, Agent, or Firm* — Harness, Dickey & Pierce, P.L.C.

(57) ABSTRACT

A seal ring 100 is configured by the combination of a first divided body 100A on a high pressure side and a second divided body 100B on a low pressure side with respect to an axis direction. The seal ring that stabilizes sealing performance while reducing rotary torque and including a recessed section 140 provided centrally in a width direction and extending in a circumferential direction and a pair of raised sections 150 provided on both sides of the recessed section 140. A through hole 141a is provided so as to lead to a bottom surface of the recessed section 140 from an inner peripheral surface side and allows a sealed fluid to be introduced into the recessed section 140 from the inner peripheral surface side.

3 Claims, 4 Drawing Sheets

SEAL RING

CROSS-REFERENCE TO RELATED APPLICATIONS

This application claims the benefit and priority of Japanese Application No. 2014-032095, filed Feb. 21, 2014(now Japanese Patent No. 2015-158215A). The entire disclosure of the above application is incorporated herein by reference.

FIELD

The present disclosure relates to a seal ring for sealing an annular gap between a shaft and a shaft hole of a housing.

BACKGROUND

A seal ring is provided to seal an annular gap between a relatively rotating shaft and a housing in order to hold oil pressure in an automatic transmission (AT) or a continuously variable transmission (CVT) in an automobile. There has been demand in recent years to reduce rotary torque in the above seal ring with advancements in lowering fuel consumption as a measure to address environmental issues. Accordingly, measures have conventionally been adopted for reducing the contact area of a sliding portion between the seal ring and a side wall surface of an annular groove where the seal ring is mounted. This type of seal ring will be described with reference to FIG. 8 in a conventional example.

FIG. 8 is a schematic cross-sectional view illustrating a seal ring according to the conventional example in use. The seal ring 300 according to the conventional example is mounted in an annular groove 510 provided around the outer circumference of a shaft 500. Further, the seal ring 300, in close contact with the inner peripheral surface of a shaft hole in the housing 600 where the shaft 500 is inserted, slidably contacts a side wall surface of the annular groove 510 and seals the annular gap between the shaft 500 and the housing 600.

Here, a pair of recessed sections 320 that extend in a circumferential direction is provided on the inner peripheral sides of both side surfaces on the seal ring 300 according to the conventional example. By this, an effective pressure receiving region, the region shown by A in FIG. 8, is produced when the seal ring 300 is pressed in an axial direction facing the low pressure side (L) from the high pressure side (H) by the sealed fluid. That is, of the side surfaces of the seal ring 300, the region in the radial direction of the portion 310 where there is no recessed section 320 makes up the effective pressure receiving region A. This is because fluid pressure acts on the region where the recessed sections 320 are provided from both sides in an axial direction thereby offsetting the applied forces in an axial direction with respect to the seal ring 300. Note that an area across the entire circumference of the pressure receiving region A makes up an effective pressure receiving area in an axial direction.

Moreover, an effective pressure receiving region, the region shown by B in FIG. 8, is produced when the seal ring 300 is pressed outward radially facing the outer peripheral surface side from the inner peripheral side by the sealed fluid. That is, the thick portion in the axial direction becomes the effective pressure receiving region B in the seal ring 300. Note that an area across the entire circumference of the pressure receiving region B makes up a pressure receiving area in a radial direction.

Accordingly, setting the "length of region A"<"the length of region B" allows sliding between the seal ring 300 and the side wall surface of the annular groove 510. Further, making the length of the pressure receiving region A to be as small as possible enables a reduction in rotary torque.

However, the contact region of the seal ring 300 against the side wall surface of the annular groove 510 is the region shown by C in FIG. 8. That is, with the seal ring 300, only the portion excluding the portion exposed to the gap between the shaft 500 and the housing 600 contacts the side wall surface of the annular groove 510 from the portion 310 where the recessed section 320 is not provided, being the side surface of the low pressure side (L). Therefore, the contact region C in the seal ring 300 is affected by the dimensions of the gap between the shaft 500 and the housing 600. Accordingly, depending on the use environment, the contact area of the seal ring 300 may be excessively small with respect to the side wall surface of the annular groove 510 thus risking lowering sealing performance. Further, according to the use environment, there is also a risk that the contact region may deform thereby destabilizing sealing performance. Additionally, as chamfer forms in the interface portion of the annular groove 510 and the outer peripheral surface of the shaft 500, the above problems are exacerbated as the chamfer increases.

DOCUMENTS OF THE RELATED ART

[Patent Document 1] Patent Publication No.: U.S. Pat. No. 3,437,312
[Patent Document 2] Patent Publication No.: U.S. Pat. No. 4,872,152

SUMMARY

Problem to be Solved by the Disclosure

An object of the present disclosure is to provide a seal ring that reduces rotary torque and stabilizes sealing performance.

Means for Solving the Problem

The present disclosure employs the following means to resolve the problems described above.

In other words, a seal ring of the present disclosure mounted in an annular groove provided around an outer circumference of a shaft for sealing an annular gap between a shaft relatively rotating and a housing to hold fluid pressure of a sealing region configured to allow change in fluid pressure, the seal ring, in close contact to a side wall surface of the annular groove on the low pressure side slides with respect to an inner peripheral surface of a shaft hole in the housing, the shaft inserted therethrough, including: on an outer peripheral surface side, a recessed section provided centrally in a width direction and extending in a circumferential direction, and a pair of raised sections provided on both sides with the recessed section therebetween for sliding with respect to an inner peripheral surface of the shaft hole; the seal ring, having a through hole provided to lead to a bottom surface of the recessed section from an inner peripheral surface side and to enable sealed fluid to be introduced into the recessed section from the inner peripheral surface side, is configured so that an effective pressure receiving area from the inner peripheral surface side that contributes to a force pressing against an inner peripheral surface of the shaft hole by the fluid pressure is narrower than an effective pressure receiving area from the inner peripheral surface side that contributes to a force pressing against a side wall surface of the annular groove on a low pressure side; and the seal ring being configured by combining a first divided body of a high pressure side and a second divided body of a low pressure side in an axial direction, and a dividing position between the first divided body and the second divided body being set so as to pass through a portion where the recessed section is provided.

Note that, in the present disclosure, "high pressure side" means the side where high pressure is produced when a pressure difference occurs on both sides of the seal ring, and "low pressure side" the side where low pressure is produced when a pressure difference occurs on both sides of the seal ring.

With the present disclosure, the outer peripheral surface of the raised section on the seal ring can be slid with respect to the inner peripheral surface of the shaft hole more reliably. By this, the area of the sliding section can be stable regardless of the size of the annular gap between the shaft and the housing. Accordingly, sealing performance can be stabilized. Further, when the portion of the raised section on the outer peripheral surface of the seal ring can be slid more reliably, sliding resistance is reduced which reduces rotary torque. Moreover, the seal ring is configured by combining the first divided body and the second divided body, and the dividing position between the first divided body and the second divided body is set so as to pass through a portion where the recessed section is provided. By this, the two bodies can be molded using only injection molding because there is no undercut section.

Further, the abutting joint section may be provided in one location in the circumferential direction, the abutting joint section providing, on the outer peripheral side of one side with a cut portion therebetween, a first fitted raised portion on the low pressure side and a first fitted recessed portion on the high pressure side, and providing, on the outer peripheral side of the other side with a cut portion therebetween, a second fitted recessed portion that fits the first fitted raised portion on the low pressure side and a second fitted raised portion that fits the first fitted recessed portion on the high pressure side; and the first divided body may be formed of the section where the first fitted recessed portion is provided and of the section where the second fitted raised portion is provided, and the second divided body may be formed of the section where the first fitted raised portion is provided and of the section where the second fitted recessed portion is provided.

Configuring in this manner allows the section where the abutting joint section is provided to be provided on the first divided body and the second divided body without the existence of an undercut section.

The third fitted raised portion that projects directly facing the low pressure side in the axial direction and the third fitted recessed portion that recesses directly facing the high pressure side in the axial direction may be alternatingly provided in plurality in the circumferential direction on the side wall surface side of the low pressure side on the first divided body; and the fourth fitted recessed portion that fits the third fitted raised portion recesses directly facing the low pressure side in the axial direction and the fourth fitted raised portion that fits the third fitted recessed portion projects directly facing the high pressure side in the axial direction may be alternatingly provided in plurality in the circumferential direction on the side wall surface side of the high pressure side on the second divided body.

This is so that the first divided body and the second divided body can be combined by positioning in the circumferential direction. Further, the third fitted raised portion and the fourth fitted raised portion are configured to protrude directly facing the axial direction, and the third fitted recessed portion and the fourth fitted recessed portion are configured to recess directly facing the axial direction. Therefore, these recessed and protruding portions may be provided on the first divided body and the second divided body without the existence of an undercut section.

It is preferable that a gap be provided in the circumferential direction between the third fitted raised portion and the fourth fitted raised portion such that the through hole is formed by the gap.

This is so that the through hole can be formed with respect to both the first divided body and the second divided body without providing an undercut section.

As described above, with the present disclosure, rotary torque can be reduced and sealing performance can be stabilized.

DRAWINGS

DETAILED DESCRIPTION

Figure 1:
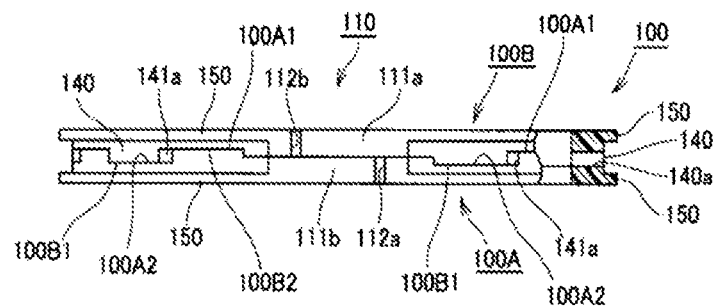
FIG. 1 is a partial cutaway cross-sectional view of the seal ring according to an embodiment of the present disclosure as viewed from the outer peripheral side.
Figure 2:
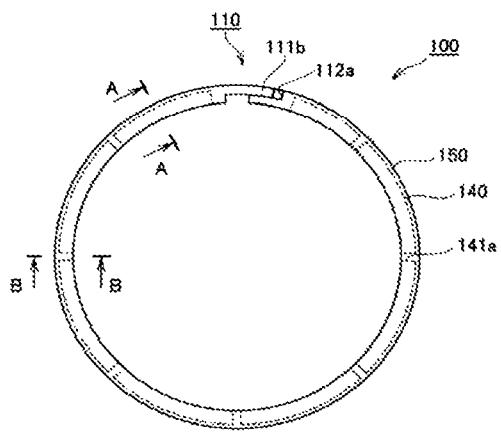
FIG. 2 is a side view of the seal ring according to an embodiment of the present disclosure.

Embodiments of the present disclosure will be described in detail below with reference to drawings based on examples. However, dimensions, materials, shapes, and such relative positions and the like of the compositional elements described in the examples are not intended to limit the scope of the present disclosure to these unless otherwise specifically stated. Note that the seal ring according to this example is for use in sealing an annular gap between a shaft relatively rotating and a housing in order to hold oil pressure in an AT, CVT, or other type of transmission for an automobile. Further, in the following description, "high pressure side" means the side where high pressure is produced when a pressure difference occurs on both sides of the seal ring, and "low pressure side" the side where low pressure is produced when a pressure difference occurs on both sides of the seal ring. Also, in the following description, "axial direction" means a central axial direction of a shaft or annular seal ring.

EXAMPLES

The seal ring according to examples of the present disclosure will be described with reference to FIGS. 1 to 7.

<Seal Ring Configuration>

The seal ring 100 according to this example is mounted in an annular groove 510 provided around the outer circumference of a shaft 500 to seal an annular gap between the relatively rotating shaft 500 and a housing 600 (the inner peripheral surface of a shaft hole in the housing 600 in which the shaft 500 is inserted through). By this, the seal ring 100 holds a fluid pressure in a sealing region configured to allow changes in fluid pressure (oil pressure in this example). Here, this example is configured to allow change in the fluid pressure in a region on the right side in FIGS. 5 to 7, and the seal ring 100 functions to hold the fluid pressure in the sealing region in the right side in the drawing. Note that, when an automobile engine is stopped, the fluid pressure in the sealing region is low producing a no-load state, and when the engine is started, the fluid pressure in the sealing region rises.

In addition, the seal ring 100 is made of a resin material such as polyether ether ketone (PEEK), polyphenolene sulfide (PPS), polytetrafluoroethylene (PTFE), and the like. Further, the circumferential length of the outer peripheral surface of the seal ring 100 is configured to be shorter than the circumferential length of the inner peripheral surface of the shaft hole in the housing 600 so as to have no interference.

An abutting joint section 110 is provided in one location in the circumferential direction on the seal ring 100. A recessed section 140 centrally provided in the width direction and extending in a circumferential direction and pair of raised sections 150 provided on both sides with the recessed section 140 therebetween that slides with respect to the inner peripheral surface of the shaft hole in the housing 100, are provided on the outer peripheral surface side of the housing 100. In addition, a through hole 141a, provided to lead to a bottom surface of the recessed section 140 from the inner peripheral surface side and to allow the sealed fluid (here, oil) to be introduced into the recessed section 140 from the inner peripheral surface side, is provided in plurality in the seal ring 100. The bottom surface of the recessed section 140 is configured by a concentric surface with the inner peripheral surface of the seal ring 100.

The abutting joint section 110 is cut in a stepped shape as viewed from either the outer peripheral surface side or both side wall surface sides, and employs a, so called, specific step cut. Configuring the seal ring 100 in this manner allows a first fitted raised portion 111a and a first fitted recessed portion 112a to be provided on the outer peripheral side of one side with the cut portion therebetween, and allows a second fitted recessed portion 112b that fits the first fitted raised portion 111a and a second fitted projecting portion 111b that fits the first fitted recessed portion 112a to be provided on the other outer peripheral side. Because the specific step cut is a known technique, a detailed description thereof is omitted, but it has characteristics to maintain stable sealing performance even when the circumferential length of the seal ring 100 changes according to thermal expansion and contraction. Note that, the specific step cut is shown here as one example of an abutting joint section 110, but the abutting joint section 110 is not limited to this and other cuts such as a straight cut, bias cut, or step cut may be employed. Note that when a material with low elasticity (such as PTFE) is used as the material for the seal ring 100, an endless configuration may be used without providing the abutting joint section 110.

The recessed section 140 is formed along the entire periphery with the exception of the vicinity of the abutting joint section 110. The area near the abutting joint section 110 where the recessed section 140 is not provided is the same surface as the outer peripheral surface of the pair of raised sections 150. Configuring in this manner forms a continuous seal surface in an annular shape on the outer peripheral surface side of the seal ring 100. That is, with the outer peripheral surface of the seal ring 100, only the outer peripheral surface of the pair of raised sections 150 slide with respect to the inner peripheral surface of the shaft hole for the region excluding the vicinity of the abutting joint section 110. Note that when employing a configuration that does not provide an abutting joint section 110, the pair of raised sections 150 also form an annular shape by providing the recessed sections 140 in an annular shape. By this, an annular continuous sealing surface can be formed using only the outer peripheral surfaces of the pair of raised sections 150.

A shallow depth for the recessed section 140 raises the rigidity of the pair of raised sections 150. Meanwhile, due to wear by sliding by the pair of raised sections 150, the depth of the recessed sections 140 becomes shallower over time. Therefore, if the depth of the recessed section 140 becomes too shallow, it is no longer able to introduce the fluid. On account of this, it is desirable that the initial depth of the recessed section 140 is set taking into account both rigidity and the advancement of wear over time in order maintain introduction of the fluid. For example, with a thickness of 1.7 mm in the seal ring 100, a depth of approximately not less than 0.1 mm and not greater than 0.3 mm may be set for the recessed section 140.

Concerning the width of the pair of raised sections 150, the narrower the width, the better the torque can be reduced, however, if the width becomes too narrow, sealing performance and durability drop. Therefore, it is desirable that the width be as narrow as possible to the extent that sealing performance and durability can be maintained. Note that, when the total length of the lateral width of the seal ring 100 is, for example, 1.9 mm, the width of the pair of raised sections 150 may be set to be approximately not less than 0.3 mm and not greater than 0.7 mm.

Additionally, in the seal ring 100 according to this example, the length obtained by adding the respective widths (corresponding to the lengths of the regions B1 and B2 in FIG. 6) of the pair of raised sections 150 is set to be shorter than the distance (corresponding to the length of the region A in FIG. 6) from the inner peripheral surface in the seal ring 100 to the outer peripheral surface of the raised section 150. Note that the length of the region B1 and the length of the region B2 are set to be equivalent.

Setting the relationship between the region A to the regions B1 and B2 allows the seal ring 100 to be configured so that an effective pressure receiving area from the inner peripheral surface side that contributes to a force pressing against an inner peripheral surface of the shaft hole by the fluid pressure is narrower than an effective pressure receiving area from the inner peripheral surface side that contributes to a force pressing against a side wall surface of the annular groove 510 on a low pressure side.

<Mechanism when Sealing Device is in Use>

Figure 5:
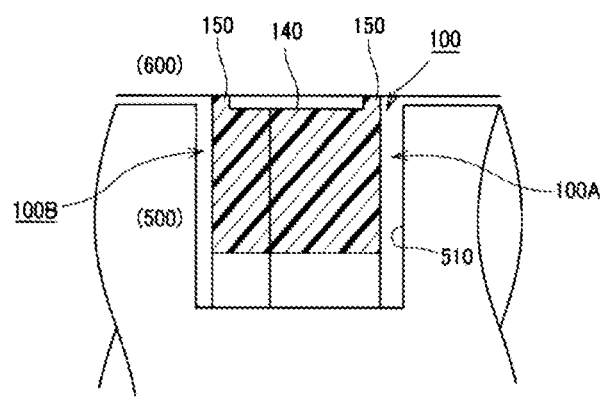
FIG. 5 is a schematic cross-sectional view illustrating the seal ring according to an embodiment of the present disclosure in use.
Figure 6:
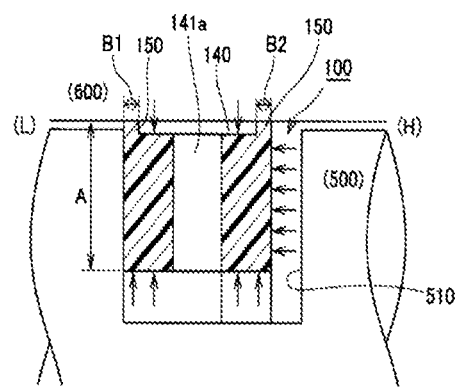
FIG. 6 is a schematic cross-sectional view illustrating the seal ring according to an embodiment of the present disclosure in use.
Figure 7:
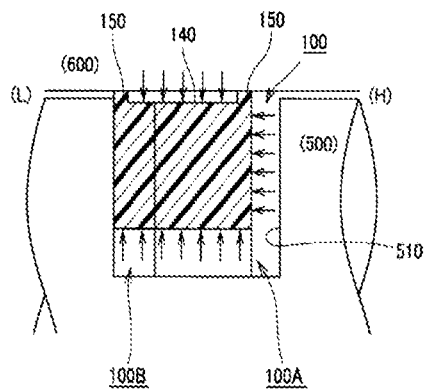
FIG. 7 is a schematic cross-sectional view illustrating the seal ring according to an embodiment of the present disclosure in use.
Figure 8:
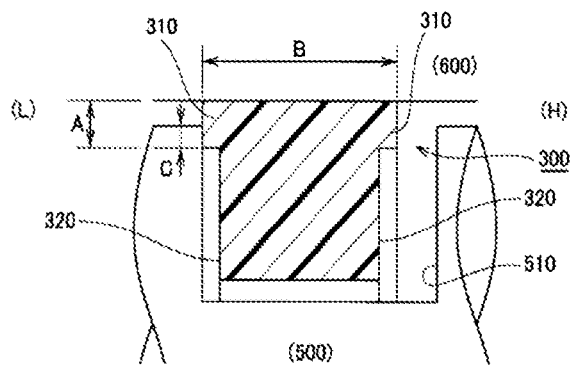
FIG. 8 is a schematic cross-sectional view illustrating a seal ring according to the conventional example in use.

The mechanism, particularly for when the seal ring 100 according to this example is in use, will be described with reference to FIGS. 5 to 7. FIG. 5 illustrates a no-load state for when the engine is stopped and there is no pressure difference (or there is mostly no pressure difference) in the left and right regions with the seal ring 100 therebetween. Note that the seal ring 100 in FIG. 5 corresponds to a cross-section AA in FIG. 2. FIG. 6 and FIG. 7 illustrate a state after the engine has started where the fluid pressure on the right side region has become higher than the region on the left side with the seal ring 100 therebetween. Note that the seal ring 100 in FIG. 6 corresponds to the cross-section BB in FIG. 2, and the seal ring 100 in FIG. 7 corresponds to the cross-section AA in FIG. 2.

Because there is no pressure difference in the left and right regions when in the no-load state, and because the fluid pressure also does not act from the inner peripheral side, the seal ring 100 can be in a state where the side wall surface and the inner peripheral surface of the shaft hole can be separated on the left side in FIG. 5 in the annular groove 510.

Further, once the engine has started and a pressure difference occurs, the seal ring 100 enters a state in which it is in close contact with the side wall surface of the low pressure side (L) of the annular groove 510 as well as being in a state to slide with respect to the inner peripheral surface of the shaft hole (see FIG. 6 and FIG. 7).

<Divided Bodies>

Figure 3:
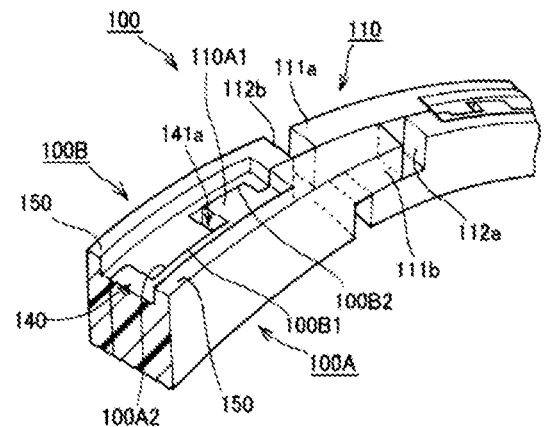
FIG. 3 is a partial cutaway perspective view of the seal ring according to an embodiment of the present disclosure.
Figure 4:
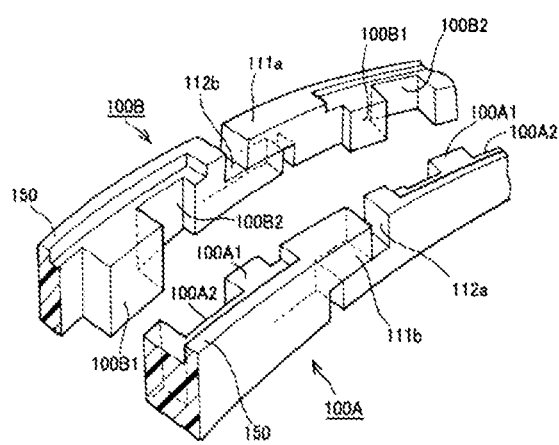
FIG. 4 is a partial cutaway perspective view illustrating a separated seal ring according to an embodiment of the present disclosure.

As given above, the recessed section 140 and a through hole 141a are provided on the seal ring 100. Because of this, when the seal ring 100 is formed by a mold, the recessed section 140 and the through hole 141a form an undercut section. Accordingly, the recessed section 140 and the through hole 141a must undergo post-processing fabrication such as machining and the like resulting in additional cost. On account of this, in this example, the seal ring 100 can be obtained by combining two divided bodies, neither of which having an undercut section. This aspect will be described with particular reference to FIG. 3 and FIG. 4. Note that FIG. 3 is a portion of a perspective view illustrating the seal ring 100 configured by combining the two divided bodies, and FIG. 4 is a portion of a perspective view illustrating the two divided bodies separated.

The seal ring 100 according to this example is configured by a combination, in the axial direction, of a first divided body 100A on the high pressure side and a second divided body 100B on the low pressure side. Further, the dividing position between the first divided body 100A and the second divided body 100B is set so as to pass through a portion where the recessed section 140 is provided. By configuring in this manner, the first divided body 100A and the second divided body 100B can both be provided without having an undercut section. That is, the first divided body 100A and the second divided body 100B can be formed using a metal mold that opens the mold in the axial direction. The following is a description in further detail.

The third fitted raised portion 100A1 that projects directly facing the low pressure side in the axial direction and the third fitted recessed portion 100A2 that recesses directly facing the high pressure side in the axial direction are alternatingly provided in plurality in the circumferential direction on the side wall surface side of the low pressure side on the first divided body 100A. Further, the fourth fitted recessed portion 100B2 that fits the third fitted raised portion 100A1 recesses directly facing the low pressure side in the axial direction and the fourth fitted raised portion 100B1 that fits the third fitted recessed portion 100A2 projects directly facing the high pressure side in the axial direction are alternatingly provided in plurality in the circumferential direction on the side wall surface side of the high pressure side on the second divided body 100B.

In this manner, the third fitted raised portion 100A1 and the fourth fitted raised portion 100B1 are configured to protrude directly facing the axial direction, and the third fitted recessed portion 100A2 and the fourth fitted recessed portion 100B2 are configured to recess directly facing the axial direction. Therefore, these recessed and protruding portions may be provided on the first divided body 100A and the second divided body 100B without the existence of an undercut section.

In addition, providing a gap in the circumferential direction between the third fitted raised portion 100A1 and the fourth fitted protruding portion 100B1 allows the through hole 141a to be formed by this gap. This is so that the through hole 141a can be formed with respect to both the first divided body 100A and the second divided body 100B without providing an undercut section.

Further, the seal ring 100 according to this example provides an abutting joint section 110 configured of a specific step cut in one location in the circumferential direction. That is, in the seal ring 100, a first fitted raised portion 111a and a first fitted recessed portion 112a are provided on the outer peripheral side of one side with the cut portion therebetween, and the second fitted recessed portion 112b and the second fitted raised portion 111b are provided on the outer peripheral side of the other side. Here, in this example, the first divided body 100A is formed of the section where the first fitted recessed portion 112a is provided and of the section where the second fitted raised portion 111b is provided, and the second divided body 100B is formed of the section where the first fitted raised portion 111a is provided and of the section where the second fitted recessed portion 112b is provided. Configuring in this manner allows the section where the abutting joint section 110 is provided to be provided on the first divided body 100A and the second divided body 100B without the existence of an undercut section.

Advantages of the Seal Ring According to this Example

With the seal ring according to this example, when a pressure difference has occurred on both sides with the seal ring 100 therebetween, the sealed fluid is introduced into the recessed section 140 from the inner peripheral surface side of the seal ring 100 via the through hole 141a. Therefore, when the fluid pressure rises, the fluid pressure in the region where the recessed section 140 is provided acts facing the inner peripheral surface side. Here, in this example, because the bottom surface of the recessed section 140 is configured by a concentric surface to the inner peripheral surface of the seal ring 100, the direction that the fluid pressure acts from the inner peripheral surface side, in the region where the recessed section 140 is provided, is directly opposite to the direction that the fluid pressure acts from the outer peripheral surface side. Note that, the arrows in FIG. 6 and in FIG. 7 indicate the condition in which the fluid pressure is acting with respect to the seal ring 100. By this, the seal ring 100 according to this example, with the increase in fluid pressure, can suppress the increase of pressure to the outer peripheral surface side of the seal ring 100 and can keep sliding torque low.

Here, with the seal ring 100 according to this example, as described above, the sum of the lengths of the regions B1 and B2 shown in FIG. 6 are set to be shorter than the length of the region A. By this, as described above, the seal ring 100 to be configured so that an effective pressure receiving area from the inner peripheral surface side that contributes to a force pressing against an inner peripheral surface of the shaft hole by the fluid pressure is narrower than an effective pressure receiving area from the inner peripheral surface side that contributes to a force pressing against a side wall surface of the annular groove 510 on a low pressure side.

In other words, the region A is an effective pressure receiving region when the seal ring 100 is pressed in the axial direction facing the low pressure side (L) from the high pressure side (H) by the sealed fluid. Further, an area across the entire circumference of the pressure receiving region A makes up the effective pressure receiving area in the axial direction. Moreover, the regions B1 and B2 are effective pressure receiving regions when the seal ring 100 is pressed outward radially facing the outer peripheral surface side from the inner peripheral side by the sealed fluid. This is because, as described above, the fluid pressure acts on the region where the recessed sections 140 are provided from both sides in an axial direction thereby offsetting the applied forces in an axial direction with respect to the seal ring 100. Note that the area across the entire circumference of the pressure receiving regions B1 and B2 makes up an effective pressure receiving area in a radial direction.

Accordingly, when a pressure difference occurs on both sides of the seal ring 100, the effective pressure receiving region (pressure receiving area), with respect to the seal ring 100, is smaller in a direction facing an outer side in a radial direction than that facing an axial direction. Therefore, the outer peripheral surface of the pair of raised sections 150 on the seal ring 100 can be slid with respect to the inner peripheral surface of the shaft hole more reliably. By this, the area of the sliding section can be stable regardless of the size of the annular gap between the shaft 500 and housing 600. Accordingly, sealing performance can be stabilized. Further, when the portion of the pair of raised sections 150 on the outer peripheral surface of the seal ring 100 can be slid more reliably, sliding resistance is reduced which reduces rotary torque. Furthermore, because the outer peripheral surface side of the seal ring 100 slides, it is easier for a lubricating film (here, oil film) to form by the sealed fluid compared to when the seal ring slides between the side wall surface of the annular groove, and thus sliding torque is even more reduced. This is because a wedge effect is exhibited by the micro gap portions therebetween when sliding between the inner peripheral surface of the shaft hole and the outer peripheral surface of the seal ring 100.

Further, in this example, the recessed section 140 is formed along the entire periphery with the exception of the vicinity of the abutting joint section 110. In this manner, in this example, providing the recessed section 140 across a broad range of the outer peripheral surface of the seal ring 100 allows the sliding area to be as narrow as possible between the seal ring 100 and the inner peripheral surface of the shaft hole in the housing 600, thereby enabling the slide torque to be extremely reduced.

Accordingly, enabling the slide torque to be reduced in this manner suppresses heat generation due to sliding thereby enabling the seal ring 100 according to this example to be favorably used even under environmental conditions of high speed and high pressure. Furthermore, by not sliding on the side surface of the annular groove 510, soft materials such as aluminum can be used as the material for the shaft 500.

Moreover, because the seal ring 100 according to this example has a symmetrical shape with respect to center surfaces in the width direction, there is no need for concern regarding installment direction when installing the seal ring 100 into the annular groove 510. Further, even if the relationship between high pressure side (H) and the low pressure side (L) are switched, the advantageous effects described above are demonstrated.

Additionally, with the seal ring 100 according to this example, because the pair of raised sections 150 provided on both sides of the recessed section 140 slide with respect to the inner peripheral surface of the shaft hole, the disposition of the seal ring 100 can be stable. That is, the seal ring 100 can be suppressed from slanting due to fluid pressure inside the annular groove 510.

Further, the seal ring 100 according to this example is configured by a combination, in the axial direction, of a first divided body 100A on the high pressure side and a second divided body 100B on the low pressure side. The first divided body 100A and the second divided body 100B are configured so that neither have been undercut section. By configuring in this manner, after formation by a mold (for example, injection molding), there is no need for post-processing fabrication of the recessed section 140 and the through hole 141a, thus enabling costs to be reduced.

DESCRIPTION OF THE NUMERICAL REFERENCES 100 seal ring
100A first divided body
100A1 third fitted raised portion
100A2 third fitted recessed portion
100B second divided body
100B1 fourth fitted raised portion
100B2 fourth fitted recessed portion
110 abutting joint section
111a first fitted raised portion
111b second fitted raised portion
112a first fitted recessed portion
112b second fitted recessed portion
140 recessed section
141a through hole
150 raised section
500 shaft
510 annular groove
600 housing

What is claimed is:
1. A seal assembly, comprising:
a housing;
a shaft rotatably received in the housing with an annular gap between the shaft and the housing
a seal ring mounted in an annular groove provided around an outer circumference of the shaft for sealing the annular gap between the shaft and the housing to hold fluid pressure of a sealing region configured to allow change in fluid pressure, the seal ring, in close contact to a side wall surface of the annular groove on the low pressure side that slides with respect to an inner peripheral surface of a shaft hole in the housing, the shaft inserted therethrough and including on an outer peripheral surface side, a recessed section provided centrally in a width direction and extending in a circumferential direction, and a pair of raised sections provided on both sides with the recessed section therebetween for sliding with respect to an inner peripheral surface of the shaft hole;
the seal ring having a through hole provided to lead to a bottom surface of the recessed section from an inner peripheral surface side and to enable sealed fluid to be introduced into the recessed section from the inner peripheral surface side, is configured so that an effective pressure receiving area from the inner peripheral surface side that contributes to a force pressing against an inner peripheral surface of the shaft hole by the fluid pressure is narrower than an effective pressure receiving area from the inner peripheral surface side that contributes to a force pressing against a side wall surface of the annular groove on a low pressure side; and the seal ring being configured by combining a first divided body of a high pressure side and a second divided body of a low pressure side in an axial direction, and a dividing position between the first divided body and the second divided body being set so as to pass through a portion where the recessed section is provided, wherein a third fitted raised portion that projects directly facing the low pressure side in the axial direction and a third fitted recessed portion that recesses directly facing the high pressure side in the axial direction is alternatingly provided in plurality in the circumferential direction on the side wall surface side of the low pressure side on the first divided body; and a fourth fitted recessed portion that fits the third fitted raised portion recesses directly facing the low pressure side in the axial direction and a fourth fitted raised portion that fits the third fitted recessed portion projects directly facing the high pressure side in the axial direction is alternatingly provided in plurality in the circumferential direction on the side wall surface side of the high pressure side on the second divided body.

2. The seal ring according to claim 1, wherein an abutting joint section is provided in one location in the circumferential direction, the abutting joint section providing, on the outer peripheral side of one side with a cut portion therebetween, a first fitted raised portion on the low pressure side and a first fitted recessed portion on the high pressure side, and providing, on the outer peripheral side of the other side with a cut portion therebetween, a second fitted recessed portion that fits the first fitted raised portion on the low pressure side and a second fitted raised portion that fits the first fitted recessed portion on the high pressure side; and the first divided body is formed of the section where the first fitted recessed portion is provided and of the section where the second fitted raised portion is provided, and the second divided body is formed of the section where the first fitted raised portion is provided and of the section where the second fitted recessed portion is provided.

3. The seal ring according to claim 1, wherein a gap is provided in the circumferential direction between the third fitted raised portion and the fourth fitted raised portion such that the through hole is formed by the gap.

* * * * *